United States Patent
Ellis et al.

(10) Patent No.: US 6,957,953 B2
(45) Date of Patent: Oct. 25, 2005

(54) RESERVOIR REDUCING SCREW TIP

(75) Inventors: Earle L. Ellis, York, PA (US); Roy N. Krohn, Wrightsville, PA (US); David A. Kesselman, York, PA (US)

(73) Assignee: Graham Packaging Company, L.P., York, PA (US)

( * ) Notice: Subject to any disclaimer, the term of this patent is extended or adjusted under 35 U.S.C. 154(b) by 71 days.

(21) Appl. No.: 10/368,417

(22) Filed: Feb. 20, 2003

(65) Prior Publication Data

US 2004/0166191 A1    Aug. 26, 2004

(51) Int. Cl.⁷ .............................................. B29C 47/38
(52) U.S. Cl. .................... 425/382.3; 425/205; 425/209
(58) Field of Search .......................... 425/382.3, 205, 425/208, 209, 190; 366/79, 80, 81

(56) References Cited

U.S. PATENT DOCUMENTS

| | | | |
|---|---|---|---|
| 3,319,299 A | 5/1967 | Kiraly | 366/77 |
| 3,550,208 A | 12/1970 | Peters | 425/192 R |
| 3,698,694 A | 10/1972 | Zeug et al. | 366/78 |
| 3,870,451 A | 3/1975 | Gokcen | 425/378.1 |
| 4,105,147 A | 8/1978 | Stubbe | 222/413 |
| 4,477,242 A | 10/1984 | Eichlseder et al. | 425/207 |
| 4,770,624 A * | 9/1988 | Ziegler | 425/208 |
| 4,966,539 A | 10/1990 | Pena | 425/208 |
| 5,240,398 A | 8/1993 | Akaguma et al. | 425/146 |
| 5,246,660 A | 9/1993 | Tsutsumi | 264/328.17 |
| 5,261,807 A * | 11/1993 | Hehl | 425/192 R |
| 5,501,519 A | 3/1996 | Miyauchi et al. | 366/78 |
| 6,102,560 A | 8/2000 | Grimm et al. | 366/79 |
| 6,168,411 B1 * | 1/2001 | Wildman | 425/197 |

\* cited by examiner

*Primary Examiner*—Joseph S. Del Sole
(74) *Attorney, Agent, or Firm*—Venable LLP; James R. Burdett; Catherine M. Voorhees

(57) ABSTRACT

An extruder for extruding extrudate is provided and includes a generally cylindrical barrel portion having an end face. A screw conveyor is rotatably arranged coaxially within the barrel portion and has a downstream end. The screw conveyor has helical flights that define a first flow path with the barrel for the extrudate. The first flow path has a first cross-sectional area. An adapter is arranged on the end face of the barrel portion and defines an exit portion of the extruder. A screw tip is secured to the downstream end of the screw conveyor and extends into the adapter. The screw tip and the adapter define a second flow path for the extrudate with a second cross-section area being at least as large as the first cross-sectional area.

11 Claims, 2 Drawing Sheets

RESERVOIR REDUCING SCREW TIP

BACKGROUND OF THE INVENTION

1. Field of the Invention

The present invention relates to an apparatus for extruding a plasticized polymer material, particularly an extruder with a reservoir reducing screw tip.

2. Related Art

In conventional extruders, extrudate is transported with a screw conveyor through a barrel portion of the extruder and out a dispensing outlet. The extrudate may be used, for example, to produce chips, flakes or pellets of solid polymer for subsequent molding. Alternately, the extrudate may be extruded directly into a mold. The area between the barrel portion and the dispensing outlet is referred to herein as an "adapter" or "reservoir."

The flow area of the extrudate between the barrel portion of the screw conveyor and the dispensing outlet in conventional extruders is large as compared with the flow area in the barrel or through the dispensing outlet. As a result, there is a large volume of deadspace formed in the adapter, typically immediately before the dispensing outlet. As the extrudate proceeds from the barrel portion into the adapter, expansion occurs which results in the changing of melt flow patterns of the extrudate. The forces from the extruder applied to moving the extrudate are lessened and therefore the motion of the extrudate slows. As a result, areas of the polymer extrudate stagnates against the adapter and layers of previously extruded polymer build-up in the adapter. Consequently, the opening of the adapter becomes smaller and the amount of extrudate being output decreases.

In addition, the stagnation of the extrudate increases the amount of time the extrudate spends in the region of the dispensing outlet. As a result, the pressure necessary to force the extrudate through the adapter increases and causes the temperature of the extruded polymer to increase. As the stagnant portion or layers of built-up polymer cool, additional heat must be continually supplied to the extrudate to improve the laminar polymer flow as the stagnant portion cools. Thus, higher temperatures are applied to the extruded polymer and the extruder must apply a higher force to move the extrudate. These factors further provide a back pressing throughout the extruder and contribute to the increased back pressure on the screw conveyor, particularly on the flights of the screw conveyor, and consequently, increase the failure rate of the screw conveyor.

In some extruders, a screw tip is attached to the end of the screw conveyor and extends into a die to that forms the extruded structure, for example, in an extruded pipe. Such a known extruder is described in U.S. Pat. No. 3,870,451 to Gokcen where, as illustrated in FIG. 1 thereof, a die 18 with a conically shaped chamber 24 receives a mandrel 29 with a generally conical upstream portion that has the same diameter of the conveyor screw 15 at its widest point. Surrounding the die are a plurality of heating bands 36. The mandrel taught by Gokcen forms a cylindrical pipe that is extruded into a sizing structure with cooling fluid to remove heat. Thus, Gokcen teaches a mandrel that acts as a die pin forming a parison with the conical chamber of the die, and is not concerned with increasing the output of the extruded material or reducing heat applied to the extruded material.

In some injection molding apparatuses, a screw tip is attached to the end of the screw conveyor and moves in and out of the nozzle body to assist the flow of plastic material from a low pressure environment through the nozzle opening into a mold. The screw tip of injection molding apparatuses also provides a seal at the nozzle body to maintain the high pressure necessary for injection molding. Thus, screw tips employed with known injection molding apparatuses are designed to stop the flow from the low pressure environment to the high pressure environment. While these injection molding screw tips may reduce the flow area of the extrudate, their design does not increase the amount of extrudate output.

SUMMARY OF THE INVENTION

Applicants overcome shortcomings in the prior art with their inventive reservoir reducing screw tip that reduces the cross-sectional flow area through an adapter of an extruder and substantially increases the output of the extruder compared to conventional extruders. According to the invention, an extruder for extruding extrudate includes a generally cylindrical barrel portion having a longitudinal axis and an end face; a screw conveyor rotatably arranged coaxially within the barrel portion where the screw conveyor has a downstream end and helical flights that define a first flow path within the barrel for the extrudate; an adapter, arranged on the end face of the barrel portion, having an opening with varying diameters that defines a second flow path for the extrudate where a downstream end of the opening defines an exit portion of the extruder; and a screw tip secured to the downstream end of the screw conveyor and extending into the adapter where the screw tip is designed to reduce dead space in a cross-sectional flow area of the second flow path while the volume of extrudate flowing through the first and second flow paths remains approximately constant. As a result of the instant invention, the amount of extrudate exiting the exit portion of the extruder is increased compared to the output of conventional extruders.

The reservoir reducing screw tip of the invention extends into the adapter so that the cross-sectional flow area of the second path between an upper edge of the opening and a side of the screw tip is approximately equal to the cross-sectional flow area between the downstream end of the opening and a lower point of the screw tip. The screw tip and adapter are designed so that the reduction of the dead space at the end of the screw conveyor, while maintaining approximately equal cross-sectional flow areas between the first and second flow paths, also results in the cross-sectional flow area surrounding the screw tip at any point being approximately equal to an amount of polymer extruded from the exit portion of the extruder. The approximate constant cross-sectional area of the flow path prevents layers of extrudate from becoming stagnate, which causes the extrudate to build-up at the end of an extruder tip. As a result, the flow of the extrudate is substantially improved through the adapter, and the prevention of stagnating extrudate eliminates the pressure that raises the temperature of the extrudate.

In an exemplary embodiment according to the invention, the opening of the adapter has a first diameter that tapers toward the longitudinal axis to a narrower second diameter, and a third diameter that tapers from a downstream end of the narrower second diameter outwardly from the longitudinal axis, and adapter and screw tip are formed so that the resultant, cross-sectional flow of extrudate between an upper edge of the first diameter opening and a side of the screw tip is approximately equal to the cross-sectional flow of extrudate between the third diameter opening and a lower edge of the screw tip.

An extruder screw tip according to one embodiment of the invention is adapted to be secured to a downstream end of a screw conveyor of an extruder and improves the flow of extrudate exiting the extruder due to its shape, width and length. One such screw tip includes a longitudinal axis, a base with means for connection to an extruder conveyor screw and a diameter approximately equal to that of the extruder conveyor screw; a rounded point disposed on an end of the screw tip opposite the base; a first portion that tapers at an angle from the base toward the longitudinal axis; and a second portion that tapers at a slight angle from the first portion to the rounded tip where the second portion is longer in length than the first portion and the tapering angle of the first portion is significantly greater than the slight angle of the second portion.

When the screw tip according to the invention is attached to a screw conveyor and extends into an adapter, the resultant flow path is reduced by the presence of the inventive screw tip while maintaining approximately equal cross-sectional flow of extrudate between the upper edge of the adapter's first diameter opening and a side of the screw tip and between the third diameter opening and a lower edge of the screw tip. The inventive screw tip and adapter are designed so that the cross-sectional flow of extrudate between the adapter and screw tip remains approximately constant thereby maintaining a constant volume of extrudate exiting the extruder. In the exemplary example according to the invention, transitions of the screw tip between the base and the first portion, and the first portion and the second portion are curved. However, the transitions may be angular to reduce the cross-sectional flow area of the extruder while increasing the output of the extruder compared to that of conventional extruders.

Further features and advantages of the invention, as well as the structure and operation of various embodiments of the invention, are described in detail below with reference to the accompanying drawings.

BRIEF DESCRIPTION OF THE DRAWINGS

The features and advantages of the invention will be apparent from the following, more particular description of a preferred embodiment of the invention, as illustrated in the accompanying drawings.

DETAILED DESCRIPTION OF THE INVENTION

Figure 1:
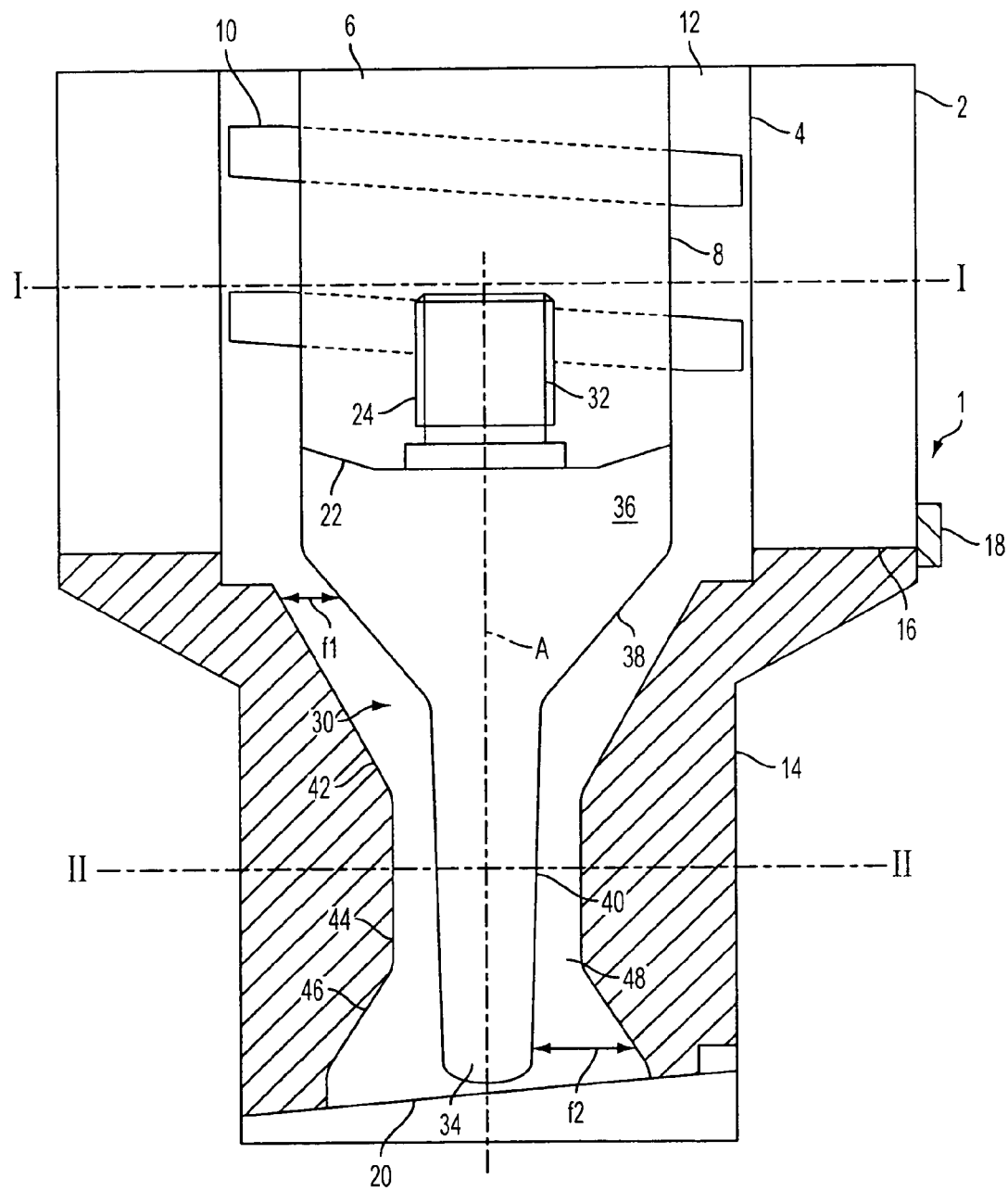
FIG. 1 is a longitudinal sectional view showing a portion of an extruder built in accordance with the principles of the present invention.

Referring to FIG. 1, there is shown a portion of an extruder, generally designated by reference numeral 1. The extruder 1 includes a suitable feeding means (not shown) for supplying plastic pellets to the extruder 1. The extruder 1 further includes a cylindrical barrel portion 2 with an inner surface 4 defining a chamber therein for receiving the plastic pellets. A rotatable screw conveyor 6 having lands 8 and generally helical flights 10 extending radially therefrom is concentrically supported within the chamber 12 of the barrel portion 2. Heat is provided to the barrel portion 2 to melt the plastic, which the screw conveyor 6 conveys through the barrel chamber 12 into an opening of an adapter 14 secured to a downstream end 16 of barrel portion 2 and out a dispensing outlet 20 at the downstream end of adapter 14.

The term "adapter" refers to the area between the barrel portion 2 and the dispensing outlet 20. The adapter 14 has an opening with varying diameters that defines a second flow path for the extrudate. The adapter 14 may be secured to end face 16 of the barrel portion 2 by a suitable clamp or securement 18.

A screw tip 30 is secured to a downstream end 22 of the screw conveyor 6. As shown in FIG. 1, screw tip 30 extends from the end 22 of the screw conveyor 6 into the opening of adapter 14. The screw conveyor 6 may have a bore 24 in the end for accepting a shank 32 or protrusion of screw tip 30; The bore 24 may have threads or other means for accepting a connecting device, for example or protrusion or shank 32 of screw tip 30. In the preferred embodiment, shank 32 is provided with left-handed threads for securement in complementary threads within the bore 24 at the end 22 of the screw conveyor 6. In order to reduce dead space in the opening of adapter 14 and depending on the shape of the adapter opening, screw tip 30 may extend from the end of the screw conveyor 6 substantially through the entire adapter 14 to a point very near the dispensing outlet 20.

Although the dimensions of the screw tip 30 depend on the dimensions of the adapter 14, the screw tip is designed to be secured to a downstream end of an extruder screw conveyor to extend a sufficient distance so that it reduces the space in an adapter through which plastic melt can be extruded thereby substantially improving the flow of the extrudate through an adapter at the end of the screw conveyor. In an exemplary embodiment, screw tip 30 may extend about 8 inches from its base at the end 22 of screw conveyor 6 to a narrow rounded point 34. In a more particular embodiment, the length of the inventive screw tip would be about 9.5 inches. As stated above, the length of the screw tip depends upon the length and shape of the adapter.

In the illustrated embodiment, the diameter of the screw tip 30 tapers at two differing angles toward the longitudinal axis A of screw tip 30 forming three portions: a base 36, a first portion 38 and a second portion 40. Base 36 has a constant diameter, which is approximately equal to the root diameter of the screw conveyor 6, and extends a distance from end 22 of screw conveyor 6 approximately into an upper edge of adapter 14. The first portion 38 tapers at an angle toward its longitudinal axis A from a downstream edge of base 36 a distance, which ends approximately one-quarter of the way inside the opening of adapter 14. The first portion of the screw tip 30 can vary in diameter from about 5 inches to about 1.5 inches.

The second portion 40 is adjacent first portion 38 and extends to the rounded point 34 at a slight angle to the longitudinal axis A. The distance that second portion 40 extends inside adapter 14 is approximately three-quarters of the adapter. The diameter or width of the second portion 40 narrows from about 1.5 inches (adjacent the first portion) to about 1 inch at the end of the rounded point 34 adjacent the dispensing outlet 20. Second portion 40 is longer in length than first portion 38 and the tapering angle of the first portion is significantly greater than the slight angle of the second portion. Again, these dimensions depend upon the size of the extruder and the depth of the adapter. In the exemplary embodiment, the transitions between the base and the first portion, and the first portion and the second portion are curved. However, the transitions may be angular.

The opening of adapter 14 has an approximate hourglass shape, which can be divided into three sections of differing diameters. The upper hourglass section 42 forms an opening that tapers from a first diameter toward the longitudinal axis A to a narrower second diameter. The mid-section of the hourglass 44 forms an opening having an approximate constant diameter, which equals that of the narrower second diameter. The approximate diameter of mid-section 44 extends a distance so that an approximate cylindrical opening is formed. While a cylindrical opening is the preferred shape, the opening may be triangular, square, rectangular, oval or any shape that provides a cross-sectional flow area consistent through mid-section 44. The bottom hourglass section 46 forms an opening with the narrower second diameter at its upper edge and tapers outwardly from longitudinal axis A to an area approximately where the rounded point 34 extends when it is inserted into adapter 14.

Adapter 14 and screw tip 30 work together to reduce dead space in a cross-sectional flow area at the end of the screw conveyor and in an adapter so that the amount of extrudate or plastic melt exiting dispensing portion 20 is increased compared to the output of conventional extruders. This is achieved by designing the adapter and screw tip so that the flow rate of the extrudate remains approximately constant throughout the adapter thereby maintaining an approximate constant output of extrudate. Thus, screw tip 30 and adapter 14 should be formed so that the cross-sectional flow or volume of extrudate between screw tip 30 and adapter 14 is approximately constant throughout adapter 14.

According to the invention, the cross-sectional area forming the flow area should not decrease, due to extrudate stagnating against the adapter and layers of extrudate building-up, as it would be necessary to increase the velocity and/or pressure of the moving extrudate or melt to maintain a constant flow rate. While a change in pressure causes increased temperature to the extrudate or melt, a change in velocity can result in increased back pressure on screw conveyor 6 and, consequently, increased failure rate of the screw conveyor. That is, as the velocity of the volume of extrudate varies, pulsing of the extrudate results, which may result in the extrudate being forced backwards against flights 10 in addition to increased back pressure. With cross-sectional areas designed so that the flow of extrudate remains approximately constant, the cross-sectional flow of extrudate in the barrel chamber 12 and adapter chamber 48 should remain approximately constant while outputting extrudate without the need to vary the velocity of the extrudate. Thus, the approximately constant cross-sectional flow of extrudate of the invention avoids pulsing of the extrudate due to velocity changes and overcomes the problems associated with pulsing the melt.

As an example, a cross-sectional flow area (f1) between the upper opening and a side of the screw tip receives a flow of extrudate that is approximately equal to the a flow of extrudate received by the cross-sectional flow area (f2) between the downstream end of the opening and a lower point of the screw tip. More particularly, cross-sectional flow area (f1) is located between an upper edge of upper hourglass section 42 and a side of screw tip 30 and cross-sectional flow area (f2) is found between a side of lower hourglass section 46 and a lower edge of rounded point 34.

The helical flights 10 of the screw conveyor 6, the lands 8 of screw conveyor 6, and the inner surface 4 of the barrel portion 2 define a first flow path for the extrudate within the barrel chamber 12. The screw tip 30 and the adapter 14 define a second flow path for the extrudate within the adapter chamber 48. Generally, the extrudate flows from the first flow path in the barrel chamber 12 defined by the screw flights 6, screw lands 8, and barrel portion 2 to the second flow path in the adapter chamber 48 defined by the screw tip 30 and the adapter 14. The extrudate then flows out a dispensing outlet 20 out of the extruder portion 1.

The first flow path has a first cross-sectional flow area, and the second flow path has a second cross-sectional flow area. The first cross-sectional flow area of the first flow path must remain approximately constant with the second cross-sectional flow area to avoid pulsing of the extrudate or melt. In the preferred embodiment, both adapter 14 and screw tip 30 are formed to create a second cross-sectional flow area of the second flow path that remains approximately constant from the top of first portion 38 toward the downstream end of first portion 38 despite the shape of screw tip 30. Both adapter 14 and screw tip 30 are designed so that the cross-sectional area between the two parts, and thus the flow rate of the extrudate or melt, remains approximately constant.

While adapter 14 is designed to have a narrower diameter at its mid-section 44, screw tip 30 is designed to have a thinner projection. Accordingly, a constant cross-sectional area results that permits a constant output of extrudate or melt to be maintained. The approximate constant cross-sectional area at mid-section 44 allows all of the plastic melt to be pushed through the first diameter opening and mid-section opening as the force is sufficient to prevent areas of plastic melt from stagnating and building-up layers of plastic melt on the inside of adapter chamber 48. The bottom hourglass section 46 permits the plastic melt to flow continually out of dispensing outlet 20. As a result, the output of the plastic melt or extrudate is substantially increased compared to the output of conventional extruders. In addition, with the invention described above, stagnated plastic melt does not build-up in adapter 14. The lack of additional heat, as well as less force needed to move the plastic melt, measurably reduces the temperature of the plastic melt.

Figure 2:
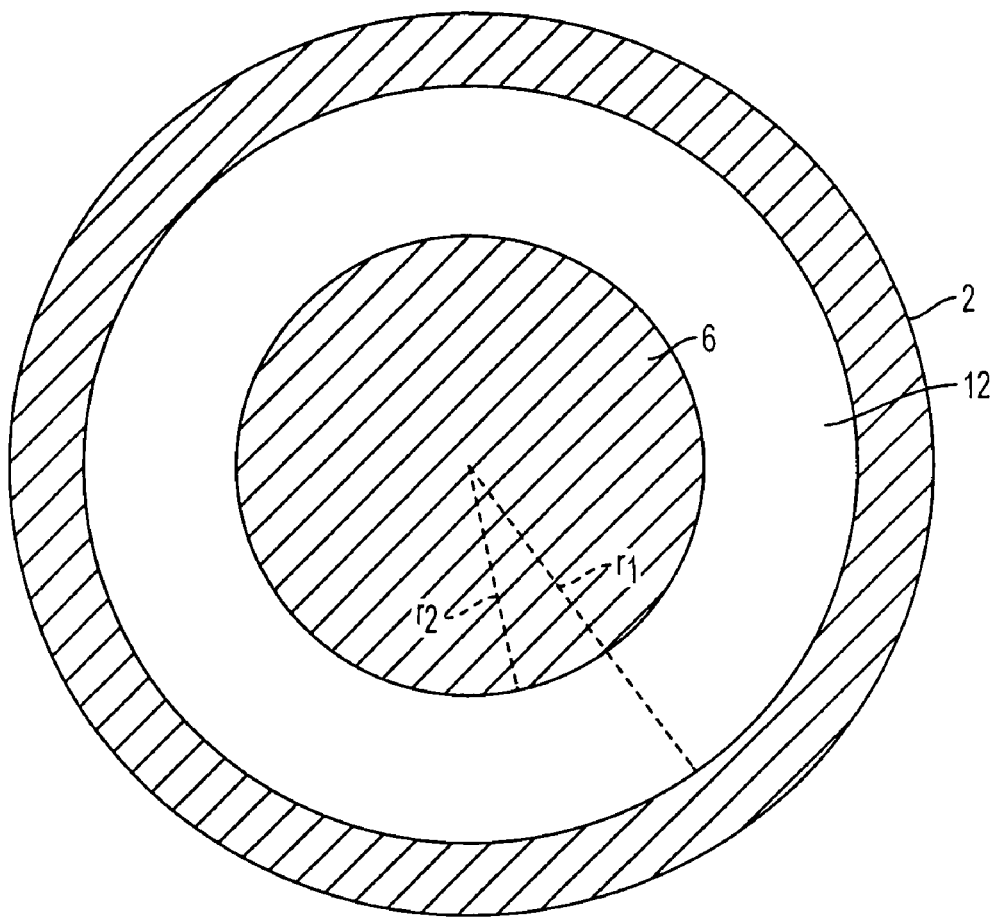
FIG. 2 is a cross sectional view of the extruder along line I—I of FIG. 1.
Figure 3:
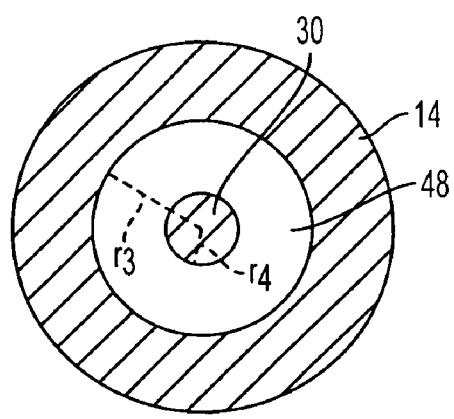
FIG. 3 is a cross sectional view of the extruder along line II—II of FIG. 1.

Exemplary first and second cross-sectional openings are illustrated in FIGS. 2 and 3. FIG. 2 is a cross-sectional view along line I—I of FIG. 1 and is an exemplary view of the first flow opening. FIG. 3 is a cross-sectional view along line II—II of FIG. 1 and is an exemplary view of the second flow opening. FIG. 2 shows the screw conveyor 6 with a radius $r_2$ and the barrel 2 with a radius $r_1$ illustrating the first cross-sectional area defining the first flow area within chamber 12. The dimension of the first cross-sectional area in FIG. 2 is calculated by $\pi(r_1^2 - r_2^2)$. FIG. 3 shows the screw tip 30 with a radius $r_4$ and the adapter 14 with a radius $r_3$ illustrating a second cross-sectional area defining the second flow area in adapter chamber 48. The dimension of the second cross-sectional area in FIG. 3 is calculated by $\pi(r_3^2 - r_4^2)$. As discussed above, the extrudate flow rate through the first and second cross-sectional areas is approximately equal according to the invention. That is, the extrudate flow rate through the cross-sectional area between barrel portion 2 and screw conveyor 6 (barrel chamber 12) is approximately equal to the extrudate flow rate through the cross-sectional area (f1) defining a flow area between the upper opening of adapter 14 and an upper side of the first portion 38 of screw tip 30 and the extrudate flow rate through the cross-sectional area (f2) defining a flow area between the downstream end of the adapter opening and a lower point of the screw tip.

It will be appreciated that, in order to minimize stagnation and, consequently, the need to apply additional heat to the extrudate, the cross-sectional second flow rate should be relatively equal between the upper edge of adapter 14 and a side of first portion 38 adjacent base 36 and between a bottom edge of adapter 14 adjacent dispensing outlet 20 and a lower side of rounded point 34. If the difference between the radius of the adapter and the diameter of the screw tip at these two areas is approximately constant, both the amount of extrudate flowing into adapter chamber 48 and the volume of extrudate exiting the end of adapter chamber 48 will be approximately equal. That is, even though the opening of adapter chamber 48 has a narrower diameter, the same volume of extrudate flows there through thereby improving the flow of extrudate out of adapter 14. Consequently, as the cross-sectional area and resultant flow area remain approximately constant throughout the flow path, the amount of pressure on flights 10 of screw conveyor 6 does not exceed the strength of screw conveyor 6.

In some applications, the diameter of mid-section 44 of adapter chamber 48 may be narrower and require a greater amount of force push the extrudate through adapter chamber 48. In this case the pressure or velocity may vary so that the flow rate of the extrudate remains relatively constant. However, this also results in a higher back-pressure at the screw conveyor and as a result, the screw conveyor must be able to withstand the back pressure.

The invention provides for a constant flow velocity and, therefore, a constant pressure on the screw conveyor, i.e., a constant back pressure. As a result, there is an overall reduction of the stress, and, therefore, the wear, on the screw conveyor, as well as motors providing motion to the screw conveyor. This is particularly useful in applications where the extrudate continues to travel through channels and passage after exiting the dispensing outlet 20 and before exiting the system to, for example, a mold.

Although the preferred embodiment has a screw tip 30 and adapter 14 which maintain an approximate constant rate of extrudate flowing through the extruder, any amount of dead space reduction within the adapter 14 is beneficial to reduce stagnation. Accordingly, the first and second cross-sectional flow areas do not have to be constant within the first and second flow paths, respectively, or equal to each other. Dead space reduction in the adapter 14 enables the extrudate to be moved more quickly out of the dispensing outlet 20 and out of the extruder 1. As a result, there is no build-up or stagnation of extrudate, and the output of the extruder 1 is substantially increased.

Furthermore, because the flow rate of the extrudate is not reduced from the first flow path within the barrel portion 2 to the second flow path within the adapter 14, the back pressure within the extruder is not increased when the extrudate enters the second flow path. More particularly, it is not necessary to continuously add heat to the system in order to maintain flow of the extrudate.

A preferred embodiment of the invention is discussed in detail above. While specific exemplary embodiments are discussed, it should be understood that this is done for illustration purposes only. A person skilled in the relevant art will recognize that other components and configurations can be used without parting from the spirit and scope of the invention.

We claim:

1. An extruder for extruding extrudate, comprising:
   a generally cylindrical barrel portion having a longitudinal axis and an end face;
   a screw conveyor rotatably arranged coaxially within the barrel portion, the screw conveyor having a downstream end, the screw conveyor having helical flights that define a first flow path within the barrel for the extrudate;
   an adapter arranged on the end face of the barrel portion, said adapter having an opening with varying diameters that defines a second flow path for the extrudate where a downstream end of the opening defines an exit portion of the extruder, the opening of the adapter having a first diameter that tapers toward the longitudinal axis to a narrower second diameter, and a third diameter that tapers from a downstream end of the narrower second diameter outwardly from the longitudinal axis, and the cross-sectional flow of extrudate between an upper edge of the first diameter opening and a side of the screw tip is approximately equal to the cross-sectional flow of extrudate between the third diameter opening and a lower edge of the screw tip; and
   a screw tip secured to the downstream end of the screw conveyor and extending into the adapter where the screw tip reduces dead space in a cross-sectional flow area of the second flow path so that the cross-sectional flow of extrudate in the first and second flow paths remain approximately constant whereby the volume of extrudate flowing through the first flow path is relatively constant with the volume of extrudate exiting the extruder.

2. The extruder of claim 1, wherein the second diameter opening has an approximate constant diameter for a length.

3. The extruder of claim 1, wherein the screw conveyor terminates within the barrel portion.

4. The extruder of claim 3, wherein the screw conveyor has lands between the helical flights and a diameter of the screw conveyor is measured between the lands and the screw tip has a base that is secured to the downstream end of the screw conveyor and has a diameter approximately equal to the diameter of the screw conveyor.

5. The extruder of claim 4, wherein the base of the screw tip extends approximately to the end face of the barrel portion, and the screw tip has a rounded tip, a first portion that tapers at an angle from the base toward the longitudinal axis and a second portion that tapers at a slight angle from a downstream edge of the first portion to the rounded tip.

6. The extruder of claim 5, wherein the rounded tip extends approximately to the exit portion.

7. The extruder of claim 5, wherein the tapering angle of the first portion is significantly greater than the slight angle of the second portion.

8. An extruder screw tip to be used in combination with a screw conveyor of an extruder for increasing the output of the extruder, said screw tip comprising:
   a base including means for connection with a downstream end of an extruder conveyor screw, the base having a longitudinal axis and a diameter approximately equal to that of the extruder conveyor screw to which the screw tip is to be connected;
   a rounded point disposed on an end of the screw tip opposite the base;
   a first portion that tapers at an angle from the base toward the longitudinal axis; and
   a second portion that tapers at a slight angle from the first portion to the rounded point where the second portion is longer in length than the first portion and the tapering angle of the first portion is significantly greater than the slight angle of the second portion wherein transitions between the base and the first portion, and the first portion and the second portion are angular.

9. An extruder for extruding polymer, comprising:
   a generally cylindrical barrel portion having a longitudinal axis and an end face;
   a screw conveyor rotatably arranged coaxially within the barrel portion, the screw conveyor having a downstream end, the screw conveyor having helical flights that define a first flow path within the barrel for the polymer;

an adapter arranged on the end face of the barrel portion, said adapter having an opening with varying diameters that defines a second flow path for the polymer where a downstream end of the opening defines an exit portion of the extruder, the opening of the adapter having a first diameter that tapers toward the longitudinal axis to a narrower second diameter, and a third diameter that tapers from a downstream end of the narrower second diameter outwardly from the longitudinal axis, and the cross-sectional flow of polymer between an upper edge of the first diameter opening and a side of the screw tip is approximately equal to the cross-sectional flow of polymer between the third diameter opening and a lower edge of the screw tip; and a screw tip secured to the downstream end of the screw conveyor and extending into the adapter where the screw tip reduces dead space in a cross-sectional flow area of the second flow path so that the cross-sectional flow of extrudate in the first and second flow paths remain approximately constant whereby the volume of extrudate flowing through the first flow path is relatively constant with the volume of extrudate exiting the extruder.

10. The extruder screw tip of claim 9, wherein transitions of the screw tip between the base and the first portion, and the first portion and the second portion are curved.

11. The extruder screw tip of claim 9, wherein transitions between the base and the first portion, and the first portion and the second portion are angular.

* * * * *